United States Patent
Finney et al.

(10) Patent No.: US 6,182,118 B1
(45) Date of Patent: *Jan. 30, 2001

(54) SYSTEM AND METHOD FOR DISTRIBUTING ELECTRONIC MESSAGES IN ACCORDANCE WITH RULES

(75) Inventors: Michael S. Finney, Hilliard; Michael L. Snider, Columbus; Randall S. Wright, Worthington; James W. Paynter, Hilliard; Robin R. Bard, Dublin, all of OH (US)

(73) Assignee: Cranberry Properties LLC, Dulles, VA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/958,058

(22) Filed: Oct. 27, 1997

Related U.S. Application Data

(63) Continuation of application No. 08/436,571, filed on May 8, 1995, now abandoned.

(51) Int. Cl.[7] .................................................. G06F 13/00
(52) U.S. Cl. ........................... 709/206; 709/224; 709/238
(58) Field of Search ..................................... 709/201, 202, 709/204, 205, 206, 207, 217, 219, 250, 328, 332, 223, 224, 225, 230, 238; 707/10, 104

(56) References Cited

U.S. PATENT DOCUMENTS

| | | | |
|---|---|---|---|
| 4,531,184 | 7/1985 | Wigan et al. | 364/200 |
| 4,837,798 | 6/1989 | Cohen et al. | 379/93.15 |
| 4,935,954 | 6/1990 | Thompson et al. | 379/93.14 |
| 4,951,196 | 8/1990 | Jackson | 705/37 |
| 5,088,032 | 2/1992 | Bosack | 395/200 |
| 5,138,653 | 8/1992 | Le Clerq | 379/93.24 |
| 5,146,488 | 9/1992 | Okada et al. | 379/100.13 |
| 5,193,110 | 3/1993 | Jones et al. | 379/93.14 |
| 5,263,157 | 11/1993 | Janis | 395/600 |
| 5,276,869 | 1/1994 | Forrest et al. | 395/600 |
| 5,283,856 | 2/1994 | Gross et al. | 395/51 |
| 5,317,568 | 5/1994 | Bixby et al. | 370/85.6 |
| 5,317,628 | 5/1994 | Misholi et al. | 379/93.14 |
| 5,333,266 | 7/1994 | Boaz et al. | 379/100.08 |
| 5,349,636 | 9/1994 | Irribarren | 379/93.15 |
| 5,438,611 | 8/1995 | Campana, Jr. et al. | 379/58 |
| 5,479,411 | 12/1995 | Klein | 370/110.1 |
| 5,483,580 | 1/1996 | Brandman et al. | 379/88 |
| 5,487,100 | 1/1996 | Kane | 379/93.24 |
| 5,497,373 | 3/1996 | Hulen et al. | 370/79 |
| 5,530,740 | 6/1996 | Irribarren et al. | 379/93.24 |
| 5,555,346 | 9/1996 | Gross et al. | 395/51 |
| 5,559,611 | 9/1996 | Bloomfield et al. | 358/407 |
| 5,606,668 | * 2/1997 | Shwed | 380/42 |
| 5,608,786 | 3/1997 | Gordon | 358/402 |
| 5,608,874 | 3/1997 | Ogawa et al. | 395/200.76 |

(List continued on next page.)

FOREIGN PATENT DOCUMENTS

0597691 A1  11/1992  (EP) .

OTHER PUBLICATIONS

1. C. J. Barter, "Transaction Processing in Message Passing Systems," Proceedings of the 6th Australian Computer Science Conference, Sydney, NSW, Australia, Feb. 10–12, 1983, pp. 177–186.

*Primary Examiner*—Viet D. Vu
(74) *Attorney, Agent, or Firm*—Standley & Gilcrest LLP

(57) ABSTRACT

A system for managing electronic messages is disclosed. Recipients of electronic messages may define a set of rules for accepting incoming messages. These rules are applied by a message distributor at substantially the initial point of distribution so that delays in routing messages are reduced. Additionally, network traffic may be reduced because message routing is more direct.

18 Claims, 4 Drawing Sheets

U.S. PATENT DOCUMENTS

| | | | |
|---|---|---|---|
| 5,619,648 | * | 4/1997 | Canale et al. .................. 395/200.36 |
| 5,633,916 | | 5/1997 | Goldhagen et al. .............. 379/93.24 |
| 5,646,981 | | 7/1997 | Klein ................................ 379/93.24 |
| 5,647,002 | | 7/1997 | Brunson ........................... 379/93.24 |
| 5,675,507 | | 10/1997 | Bobo, II ........................... 379/100.1 |
| 5,742,668 | | 4/1998 | Pepe et al. ........................ 455/415 |
| 5,742,905 | | 4/1998 | Pepe et al. ........................ 455/461 |
| 5,758,088 | | 5/1998 | Bezaire et al. .................. 395/200.62 |
| 5,765,033 | * | 6/1998 | Miloslavsky ....................... 709/206 |
| 5,765,170 | | 6/1998 | Morikawa .......................... 707/200 |
| 5,884,033 | * | 3/1999 | Duvall et al. ...................... 709/206 |

* cited by examiner

SYSTEM AND METHOD FOR DISTRIBUTING ELECTRONIC MESSAGES IN ACCORDANCE WITH RULES

This application is a continuation of application Ser. No. 08/436,571 filed May 8, 1995, now abandoned.

BACKGROUND AND SUMMARY OF THE INVENTION

The present invention relates generally to a system for managing electronic messages, and particularly, to a system for managing delivery of electronic messages according to the message recipient's preferences.

Electronic mail, or e-mail, provides a convenient and easy means for two or more individuals to communicate electronically. E-mail systems today help users send text-based and binary messages through extensive communication networks so that two or more users, who may be in remote locations, can communicate. E-mail may also be used for delivery of important business, financial, sports and other types of information from centralized repositories. The use of e-mail today has become so pervasive that many users now need a way to manage the influx of messages sent to their electronic mailboxes.

Today, most e-mail messages are stored in an electronic mailbox until the recipient reads them To aid the recipient in reading, the e-mail system presents a list of messages in chronological order. Users manage these messages by manually selecting and reading those messages that are of interest. Users often scan either the sender information or the subject heading to locate messages of interest. When the number of incoming messages is very large, the process of scanning and selecting messages to read may be very time consuming. Actually reading and responding to or forwarding the messages takes additional time. All message management decisions and related actions are left to the user.

Some e-mail systems today provide more sophisticated mechanisms-sometimes referred to as "filter and forward" mechanisms—for sorting, selecting, and responding to messages. With the mechanisms, users may define specific criteria—or rules—by which messages are presented and handled in order to meet their personal preferences. For example, users define a rule so that all incoming messages are routed automatically to a different mailbox or perhaps, a paging device. A rule may be defined so that an incoming message triggers the automatic sending of a related message to a specific group of users. Another rule may result in the sorting and presentation of messages according to a priority assigned by the sender. Some systems may allow users to define a list of senders from whom the recipient is willing to receive messages while all other messages are discarded automatically. Some systems may also allow users to accept only those messages relating to particular topics. In many instances, messages may be presented according to a combination of preferences or rules so that, for example, messages relating to a particular topic and from a specific sender may be forwarded automatically to a select group of users interested in the topic.

In addition to providing different rule sets for the filtering and forwarding of messages, e-mail systems may apply the rules at different times. For example, in many e-mail systems responsibility for the filtering and forwarding of messages is distributed among the servers responsible for distributing the messages to individual users. If the recipient's server is not available, then the rules are not applied. Therefore, a message that should be forwarded to interested parties will not be sent until the recipient's server is available to apply the rules and perform the necessary actions. As a result, there may be a significant time delay between the time that a message is sent and the time that other interested parties learn of the message. Even if the server is available, time delays may result because the message must go to the server responsible for servicing the recipient before the rules are applied. If the recipient has defined a rule for the message to be forwarded automatically, the message makes an unnecessary, intermediate stop at the server before being forwarded according to the intended recipient's rule. The rules are not applied until the message, effectively, is delivered to the intended message recipient or the message reaches a final destination. In this respect, when the intended recipient's rules are determined and applied to the electronic message, the process of sending a message begins again and the original intended message recipient becomes a message sender.

Rules may also be applied when messages arrive at a client that performs mail services. However, significant time delays may result if the client is not available. In addition, network traffic may increase as messages from the client must travel to a central distribution point before being forwarded to the appropriate location. The same problems that exist when a server applies rules late in the distribution process are present when a client applies the rules. The forwarding of messages to others is delayed until the message arrives at the client and the client is able to apply the rules. Once again, because rules are applied after the message reaches its initial destination, for additional messages to be sent, the message sending process begins again. Consequently, the intended recipient's rules are in reality preferences of a message sender rather than preferences of a message recipient. Messages are thus delivered in accordance with the message sender's preferences.

The present invention addresses the problems that result when filter and forward rules are applied to electronic messages late in the distribution process. In the present invention, message management rules defined by the intended recipient are applied soon after the originator sends the message so that messages may be forwarded or new messages generated and sent to other users regardless of whether the message may be delivered immediately to the intended recipient or whether it reaches a certain destination. Rules are applied upon entry of the message into the wide area network of the information service rather than after the message is delivered to the recipient as in prior art systems. Using the present invention, users specify message selection criteria based on attributes of incoming messages. Next, users specify the action to be associated with messages that meet the selection criteria. A distributor then applies the rules at the beginning of the message distribution process so that the intended recipient's specified actions are carried out even if the intended recipient is unable to receive the message. Because rules are applied prior to delivery of the message, an incoming message is processed in accordance with a message recipient's preferences. In a preferred embodiment of the present invention, the rule definition and application services are provided by an information service that has the ability to support a large number of users and the ability to accept incoming messages from a variety of other sources. The advantages of the present invention are explained further by the accompanying drawings and detailed description.

DETAILED DESCRIPTION OF PREFERRED EMBODIMENT(S)

Figure 1:
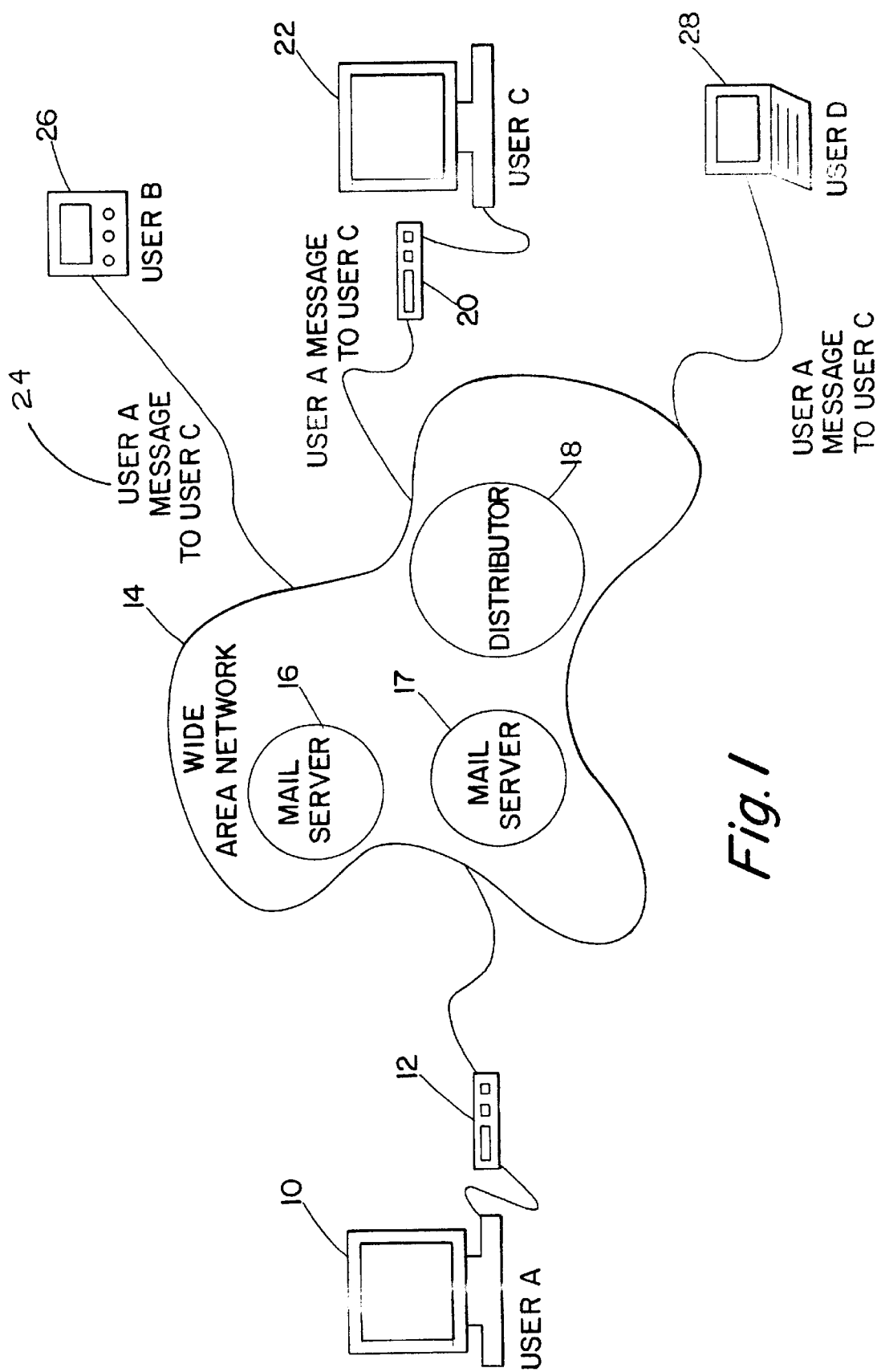
FIG. 1 is a diagramatic view of the system organization for a preferred embodiment.

Referring now to FIG. 1, there is a preferred embodiment of the system of the present invention. Preferably, to send a message to User C 22, User A connects to an information service wide area network 14 via a modem 12. User A may be, but is not required to be, a subscriber of the information service. User A may use other means for connecting to the information service without departing from the spirit and scope of the present invention. User A's message may pass through one or more information service mail servers before User C's workstation 22 may retrieve it via a modem 20. In some instances, the servers through which the message passes perform one or more operations on the message before sending it to the next server. Additionally, one server may call another server to provide information necessary to complete an operation.

When User A's message arrives at the wide area network of the information service to be delivered to User C (i.e., at the initial point of entry of the message into the information service), User C's message delivery preferences are examined to determine if any special rules should be applied to User A's message. Preferably, the information service distributor 18 is responsible for applying the rules to User A's message. If, for example, User C wants a copy of all messages from User A to be sent directly to Users B 26 and D 28, the distributor will ensure that arrangements are made to send User A's message 24 to Users B and D, even if User C's electronic mailbox is unavailable or User C is not logged in.

Figure 2:
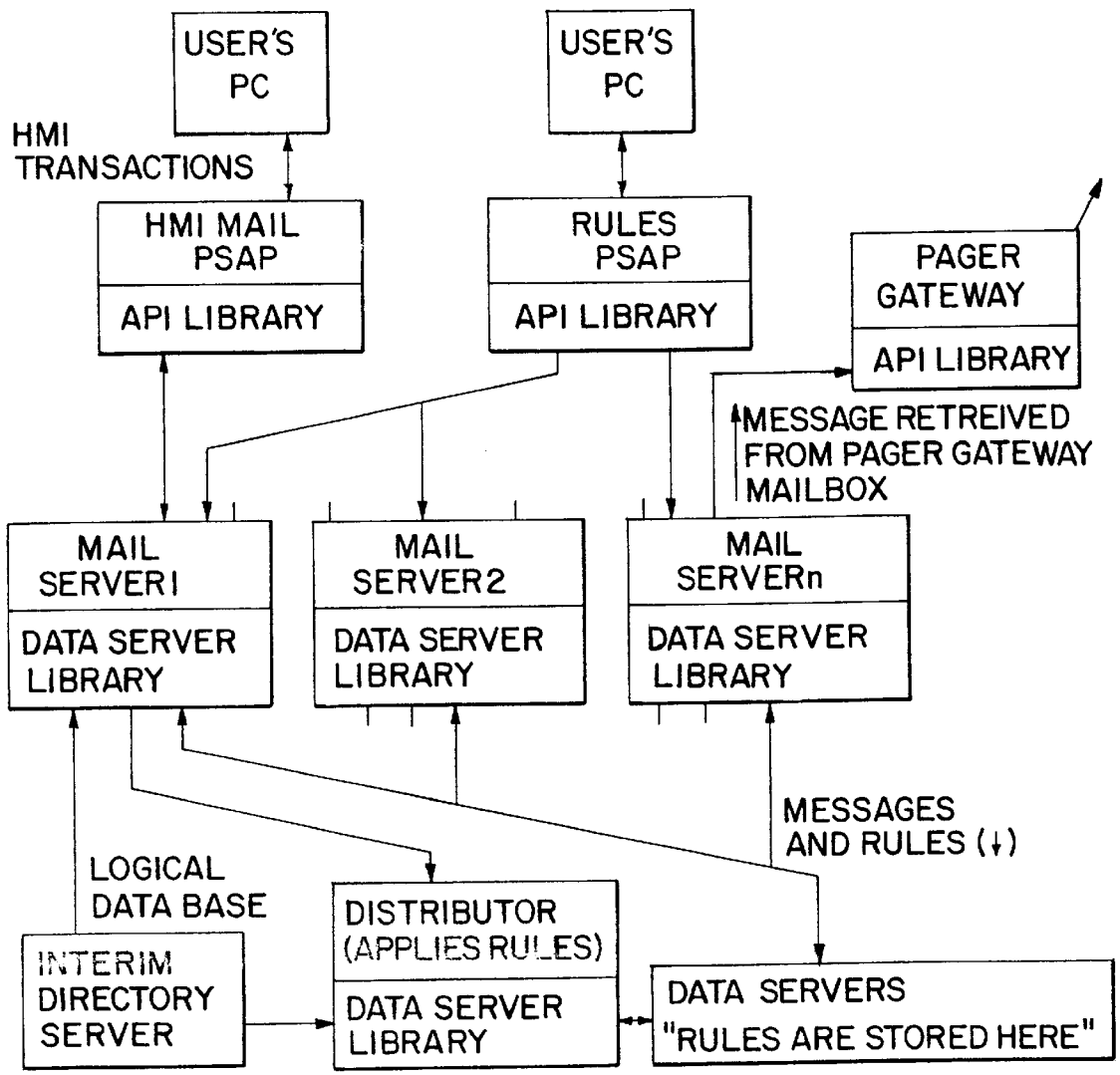
FIG. 2 is a flow chart of the steps for defining rules to be applied to a recipient's incoming messages.

Referring now to FIG. 2, there is shown a diagrammatic view of a preferred embodiment of the present invention. FIG. 2 shows the organization of servers responsible for the rule definition and application as well as message distribution.

Figure 3:
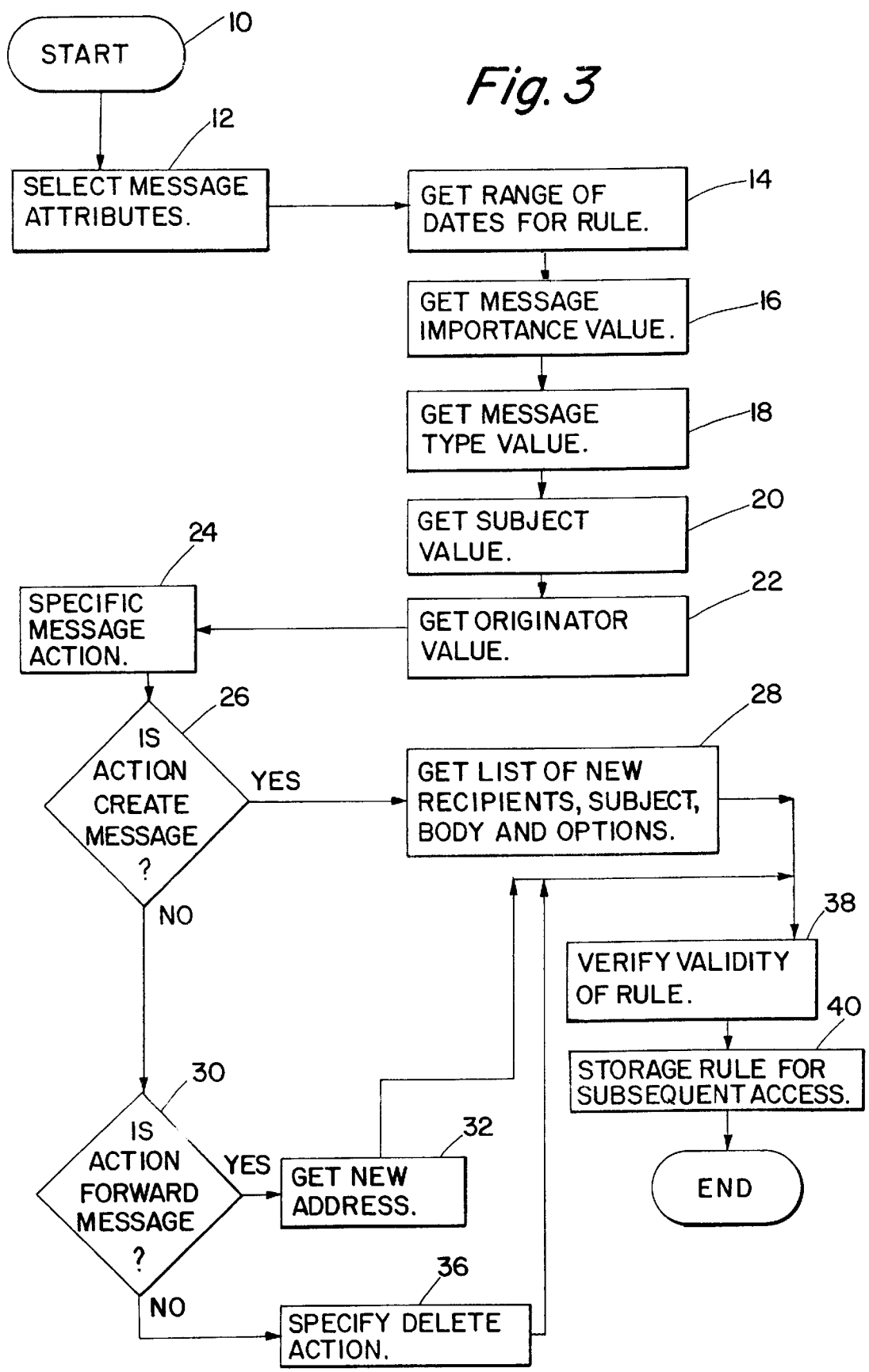
FIG. 3 is a flow chart of the steps for applying the user-defined rules to a recipient's incoming messages.

Referring now to FIG. 3, preferably, the rule definition process begins with the user specifying the message selection criteria 12. The selection criteria described herein is exemplary only. Fewer criteria or more detailed criteria may be used without departing from the scope and spirit of the present invention. Preferably, the user specifies the range of dates during which each rule will be active 14. Another selector may be an importance value such as high, normal, or low 16. A message type, such as text or binary, may be specified 18. Preferably, the user may specify a subject or originator value 20, 22.

Next, the user specifies a message action to be performed when the message selection criteria are met 24. The actions described herein are exemplary only. Other actions may be specified as well without departing from the scope and spirit of the present invention. If the associated action is to create a new message 26, then preferably, the user specifies a list of new message recipients as well as a subject and body for the new message 28. Other options may be specified for the new message such as importance or type. If the associated action is to forward the message 30, then preferably, the user specifies the forwarding address 32. If the associated action is to delete the incoming message 36, then preferably, an indicator for this action is associated with the message selection criteria 36.

In the next step 38, the validity of the rule is established so that the distributor is able to carry out the specified actions when the message selection criteria are met. In step 40, the valid rules are stored for later retrieval by the distributor. The same process may be used to define multiple rules. Preferably, the user is given the option of specifying an order in which the rules should be applied to incoming messages.

Figure 4:
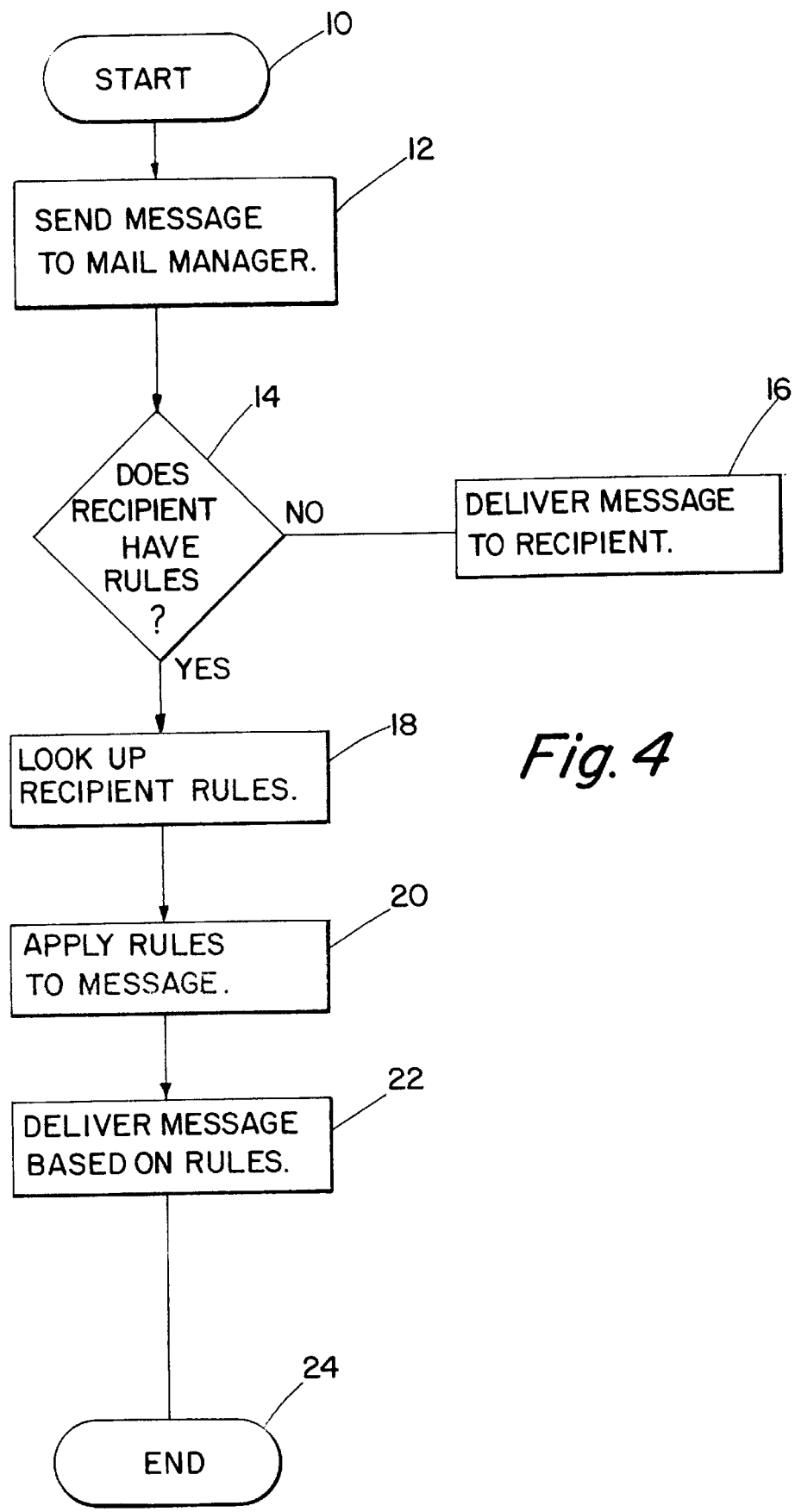
FIG. 4 is a flow chart of the steps for applying the rules during message distribution.

Referring now to FIG. 4, there is shown the steps for applying the user-defined rules during message distribution. These steps are applied to the message upon entry of the message into the wide area network, before the message is delivered to its intended recipient. Initially, the message is sent to a mail server capable of retrieving information about the recipient 12. The mail server determines whether the recipient has defined rules for incoming messages 14. If the recipient has not defined message management rules, then the message is delivered directly to the recipient 16. If the recipient has defined message management rules, then the recipient's rules are retrieved 18 and applied to the message 20. Finally, the message is delivered according the rules 22. For example, if the incoming message should result in the distribution of a new message to five other users, the mail server and distributor coordinate activities to ensure that the new message is created according to the rules specified by the recipient and that the new message is delivered to each of the five other users.

Preferably, the retrieval and application of the message management rules are performed by a distributor working in conjunction with one or more mail servers. In an alternative embodiment, the rule retrieval and application and message delivery functions may be performed by one entity. Additionally, the functions may be performed by several entities. More important than the number of entities involved is the point at which the rules are applied. The present invention applies the rules soon after the message is sent by the originator so that greater efficiencies result. Rules are applied as part of the message transmission or distribution process which begins upon the message's entry into wide area network. By applying the rules during transmission of the electronic message at its an initial point of entry into the wide area network, messages are processed quickly and are delivered to one or more recipients in accordance with the intended message recipient's preferences.

The ability of the distributor to interpret user-defined rules and arrange for delivery of message based on those rules is unique to the present invention. The intended recipient's rules for message management are carried out regardless of whether the intended recipient is able to receive the message because the rules are applied substantially at the primary point of distribution. Several benefits result from the approach of the present invention. First, network traffic may be reduced because any additional messages that should be sent as a result of the intended recipient's preferences are generated and sent from the central distribution point when User A's message arrives rather than from an alternative point that requires messages to be routed through the central distribution point anyway. Second, if the message should be forwarded directly to another recipient, network traffic may be reduced by eliminating the stop at the intended recipient's mailbox—especially if the message must return to the centralized distribution point. Finally, the present invention results in better resource utilization because messages that the intended recipient does not want to see may be discarded early in the distribution process. The elimination of unnecessary message stops, the elimination of the dependency of message delivery on the availability of intended recipient's mailbox, and the reduction in network traffic result in the more timely delivery of important personal and business information in the form of electronic messages.

What is claimed is:

1. An electronic messaging system comprising:
   a first device capable of sending an electronic message;
   a second device capable of receiving said electronic message;
   a wide area network capable of accepting an electronic message directly or indirectly from said first device and capable of sending said electronic message to said second device or a computer network linked to said second device;
   a set of rules defining which electronic messages should be sent to said second device;
   a memory unit for storing said set of rules;
   a wide area network distributor capable of applying said set of rules to said electronic message from said first device during transmission of said electronic message from an initial point of entry into said wide area network to said second device.

2. The system of claim 1, wherein a rule from said set of rules applied to said electronic message may cause the generation of one or more new messages to be sent to one or more different devices.

3. The system of claim 1, wherein a rule from said set of rules applied to said electronic message may cause a message to be forwarded to a different device.

4. The system of claim 1, wherein said distributor is part of an information service wide area network.

5. The system of claim 1, wherein said set of rules includes a rule based on the originator of an electronic message.

6. The system of claim 1, wherein said set of rules includes a rule based on the subject of an electronic message.

7. The system of claim 1, wherein said set of rules includes a ruled based on the priority of said electronic message.

8. The system of claim 1, wherein said set of rules includes a rule based on the electronic message type.

9. The system of claim 1, wherein a recipient of messages at said second device defines said set of rules.

10. A method for managing electronic messages, said method comprising the steps of:
    providing a first device capable of sending an electronic message;
    providing a second device capable of receiving said electronic message;
    providing a wide area computer network capable of accepting an electronic message directly or indirectly from said first device and capable of sending said electronic message to said second device or a computer network linked to said second device;
    defining a set of rules for accepting electronic messages at said second device;
    applying said set of rules to said electronic message during transmission of said electronic message from an initial point of entry into said wide area computer network to said second device, said application of rules being performed by a wide area computer network distributor; and
    transmitting to said second device said electronic message that conforms to said set of rules, said transmission of said electronic message being performed by said wide area computer network.

11. The method of claim 10, wherein a recipient of electronic messages at said second device defines said set of rules.

12. The method of claim 10, wherein said distributor is part of an information service network.

13. The method of claim 10, further comprising the step of generating one or new electronic messages to be sent to one or more different devices in accordance with a rule from said set of rules applied to said electronic message.

14. The method of claim 10, further comprising the step of forwarding said electronic message to one or more different devices in accordance with a rule from said set of rules applied to said electronic message.

15. An electronic messaging system comprising:
    a first device for sending an electronic message;
    a second device for receiving an electronic message;
    a wide area computer network for accepting electronic messages directly or indirectly from said first device and for sending electronic messages to said second device or a computer network linked to said second device;
    a set of rules defining which electronic messages should be sent to said second device;
    a memory unit for storing said rules;
    a wide area computer network distributor for retrieving said rules from said memory unit, interpreting and applying said rules to said electronic message from said first device during transmission of said electronic message from an initial point of entry into said wide area computer network to said second device and for transmitting through said wide area computer network to said second device or a computer network linked to said second device said electronic messages in conformance with said rules.

16. The system of claim 15 wherein a recipient of electronic messages at said second device defines said set of rules.

17. A method for delivering electronic messages received at a wide area computer network, said method comprising the steps of:
    defining a set of rules to be applied to electronic messages addressed to an electronic message recipient, said set of rules defined by said electronic message recipient;
    receiving an electronic message at said wide area computer network, said electronic message addressed to said electronic message recipient; and
    distributing via a wide area computer network distributor said electronic message in accordance with said set of rules defined by said electronic message recipient.

18. The method of 1 wherein the step of distributing said electronic message comprises the steps of retrieving said set of rules from a memory unit at said computer network, interpreting and applying said set of rules to said electronic message, and delivering one or more electronic messages to one or more electronic message recipients in accordance with said set of rules.

* * * * *

UNITED STATES PATENT AND TRADEMARK OFFICE
CERTIFICATE OF CORRECTION

PATENT NO. : 6,182,118 B1
DATED : January 30, 2001
INVENTOR(S) : Finney et al.

Page 1 of 1

It is certified that error appears in the above-identified patent and that said Letters Patent is hereby corrected as shown below:

<u>Column 5,</u>
Line 39, please delete the word "ruled" and replace it with -- rule --.

Signed and Sealed this

Twenty-ninth Day of January, 2002

Attest:

JAMES E. ROGAN
*Attesting Officer*     *Director of the United States Patent and Trademark Office*